United States Patent [19]

Saitoh et al.

[11] Patent Number: 4,806,318

[45] Date of Patent: Feb. 21, 1989

[54] APPARATUS FOR PURIFYING CRYSTALS

[75] Inventors: Shigeru Saitoh; Masaki Shimada, both of Iwaki, Japan

[73] Assignee: Kureha Kagaku Kogyo Kabushiki Kaisha, Tokyo, Japan

[21] Appl. No.: 37,702

[22] Filed: Apr. 13, 1987

[30] Foreign Application Priority Data

Apr. 15, 1986 [JP] Japan .................................. 61-86696

[51] Int. Cl.$^4$ ............................................... B01D 9/00
[52] U.S. Cl. .................................... 422/251; 422/253; 422/254; 62/542; 62/544
[58] Field of Search ............... 422/245, 251, 252, 254; 62/542, 544, 545

[56] References Cited

U.S. PATENT DOCUMENTS

| | | | |
|---|---|---|---|
| 2,659,761 | 11/1953 | Frevel et al. | 422/254 |
| 2,851,368 | 9/1958 | Findlay | 422/251 |
| 3,305,320 | 2/1967 | Weech | 422/251 |
| 3,392,539 | 7/1968 | Grimmett | 422/251 |
| 3,770,386 | 11/1973 | Hayashi et al. | 62/542 |
| 4,544,391 | 10/1985 | Oka | 62/544 |
| 4,588,562 | 5/1986 | Saitoh et al. | 422/245 |

FOREIGN PATENT DOCUMENTS

| | | | |
|---|---|---|---|
| 0004401 | 1/1984 | Japan | 422/254 |
| 0715100 | 2/1980 | U.S.S.R. | 422/245 |
| 2064976 | 6/1981 | United Kingdom | 422/251 |
| 2146257 | 4/1985 | United Kingdom | 422/254 |

*Primary Examiner*—Robert L. Stoll
*Assistant Examiner*—R. Bruce Breneman
*Attorney, Agent, or Firm*—James P. Ryther

[57] ABSTRACT

An apparatus for purifying crystals comprises a crystal purifying tower having a transverse cross-section of two partially overlapping circles, stirrers each comprising a rotational shaft passing through the center of each of the circles and having blade members disposed spirally on its surface, a solid-liquid separation plate disposed at the bottom portion of the tower, a liquid take out means disposed below the separation plate, a starting crude crystal feed means disposed above the separation plate, a purified crystal take out means disposed at the upper portion of the tower, heating means disposed in the tower in a multistage manner along the longitudinal direction of the tower, and purified crystal circulation means for cooling a portion of purified crystals taken out from the tower and feeding back the cooled crystals to the tower at at least one portion of the tower.

7 Claims, 4 Drawing Sheets

APPARATUS FOR PURIFYING CRYSTALS

BACKGROUND OF THE INVENTION

1. Field of the Invention

This invention relates to an apparatus for continuously purifying crystals by contacting crystalline substance containing impurities with a molten liquid resulted from the crystal component in a counter-current manner.

2. Description of the Prior Art

Various apparatus for purifying crystals have been known and used so far, including those adapted to purify crystals by utilizing a molten liquid resulted from a crystal component, for example, as disclosed in Japanese Patent Publication No. 40621/1972. The apparatus disclosed in the patent publication is a vertical type purifying apparatus comprising means for feeding a substance to be purified including impurities into the lower portion of a tower, in which crystals are melted in the upper portion of the tower, the resulted molten liquid is caused to contact with the crystals uprising in the tower in a counter-current manner and the crystals purified through the contact are taken from the upper portion of the tower. Two or more rotational shafts are disposed inside the purifying tower, and blade members are disposed spirally around the outer circumference of each of the rotational shafts, so that crystals fed from the lower feed port are transferred upwardly while being disintegrated. A heating portion is disposed, optionally, as means for preventing the deposition of the crystals onto the rotational portion or the wall surface of the tower itself. The apparatus is adapted to purify the crystal substance while rotating the rotary blades in the directions opposing to each other.

When crude crystals containing impurities are purified by using the liquid of the molten aimed crystal component in the crystal purifying apparatus of the foregoing structure, starting crude crystals are fed from the lower portion of the purifying tower and transferred upwardly toward the top of the tower by the rotary blades disposed inside. The crystals reaching the top of the tower are melted by a required amount into a liquid for recycle, which gravitationally moves downwardly in the inside of the tower. Thus, crystals reaching the top of the tower while being washed with the molten liquid are taken out from the top of the tower at a desired purity.

As the result of the analysis and study for the function in the crystal purification, the present inventors have discovered that the crystals are purified by the three types of effects taken place simultaneously, that is, the washing effect in which the surface of crystals uprising in the tower are washed through the continuous counter-current contact with the descending molten liquid at high purity, the sweating effect in which impurities contained in the crystals are removed when the crystals are heated and stagnated by the descending molten liquid and the recrystallizing effect in which the descending molten liquid is cooled to recrystallize due to the crystals uprising from the lower portion of the tower.

Although it has been found that the washing effect by the molten liquid is extremely remarkable, among the effects as described above, the purity obtained upon purification has a certain limit only with this washing effect. This is shown by the trend of the solid line in the graph of FIG. 2, which illustrates the relationship between the content of impurities in the crystal obtained by continuously washing crude crystals with a sufficient amount of pure liquid and the quantity of the washing liquid. As apparent from the graph, while the washing effect can be improved by the increase in the quantity of the washing liquid, it can be expected to attain no higher washing effect when the impurity content is decreased to a certain level. While on the other hand, the purity of crystals obtained by the apparatus as described in the Japanese Patent Publication No. 40621/1972 corresponds to the point a at the lower end of the broken line in FIG. 2 and exceeds the purity of crystals obtained by the washing experiment as described above. This may be attributable to the actions of the sweating effect and recrystallizing effect in addition to the washing effect. Besides, crystals at a purity near that as shown by the broken line in FIG. 2 can be obtained when a certain amount of crude crystals in an eutectic system is heated to a temperature near the melting point and then washed with a pure liquid after maintaining for about one hour. This shows that the sweating effect acts much effectively. Further, in the experiment where crude crystals of a predetermined amount are placed and heated to a predetermined temperature on a metal gauze situated in a container and recrystallized while extracting a portion of a falling liquid, the purity of the thus obtained crystals is extremely high in the same level as above.

Thus, the present inventors have studied on the method of improving the washing, sweating and recrystallizing effects together. However, in the purifying apparatus as described in the Japanese Patent Publication No. 40621/1972, if the functions of these effects are intended to be improved, the purification yield (ratio of the product relative to starting material) is extremely worsened. This may be attributable to the fact that while the foregoing three effects can be improved by increasing the amount of heat in the upper portion of the purifying tower, the molten liquid falls in the tower and discharged out of the system from the bottom to significantly worsen the yield since this prior apparatus has no cooling means for the crystals.

In order to overcome the problem, the present inventors have studied and invented a purifying apparatus (Japanese Patent Laid-open No. 25504/1985) wherein the amount of heat in the upper portion of the purifying tower can be increased by adequately maintaining the heat balance in the tower, for instance, by the manner that a portion of the molten liquid is taken out from the bottom of the tower and circulated after being cooled to be fed back to the bottom of the tower, or a portion of crystals at low purity is taken out from the bottom of the tower and circulated after being cooled. However, it has been found that the apparatus is still not sufficient.

In the purifying apparatus using the liquid of the molten aimed crystal component and provided with heating means only at the upper portion of the purifying tower as described in the Japanese Patent Publication No. 40621/1972 or Japanese Patent Laid-open No. 25504/1985, the amount of heat cannot be sufficiently increased in view of the heat balance in the tower. This may be attributable to the fact that sufficient cooling means in proportion to the increase of the amount of heat cannot be provided in the purifying tower of the conventional apparatus.

SUMMARY OF THE INVENTION

Accordingly, it is an object of the present invention to provide an apparatus for purifying crystals wherein the amount of heat in the purifying tower can be increased.

It is another object of the present invention to provide an apparatus for purifying crystals wherein the heat balance in the purifying tower is adequately maintained to increase the amount of heat.

It is still another object of the present invention to provide an apparatus for purifying crystals in which the washing, sweating and recrystallizing effects are improved together.

The above and other objects are attained by the invention as follows.

According to the present invention, there is provided a crystal purifying apparatus comprising:

a crystal purifying tower having a transverse cross-section of two partially overlapping circles;

stirrers, each comprising a rotational shaft passing through the center of each of the circles and having blade members disposed spirally on its surface;

a solid-liquid separation plate disposed at the bottom portion of the tower;

a liquid take out means disposed below the separation plate;

a starting crude crystal feed means disposed above the separation plate;

a purified crystal taken out means disposed at the upper portion of the tower;

heating means disposed in the tower in a multistage manner along the longitudinal direction of the tower; and purified crystal circulation means for cooling a portion of purified crystals taken out from the tower and feeding back the cooled crystals to the tower at at least one portion of the tower.

Other and further objects, features and advantages of the invention will appear more fully from the following description.

DETAILED DESCRIPTION OF PREFERRED EMBODIMENTS

Figure 3:
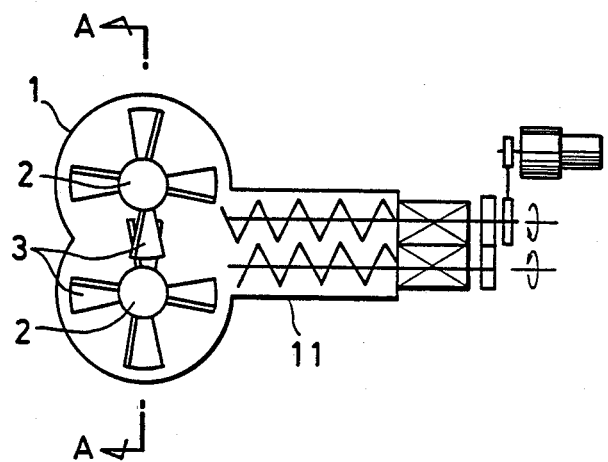
FIG. 3 is a schematic transversal sectional view of the purifying tower of the apparatus of FIG. 1.
Figure 4:
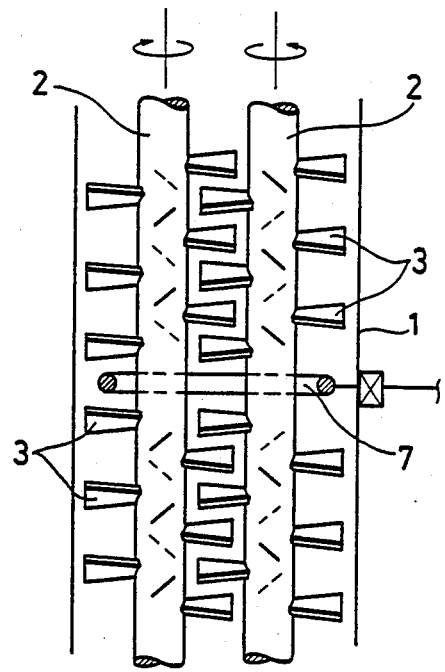
FIG. 4 is a sectional view taken along the line A—A of FIG. 3.

As shown in FIGS. 3 and 4, a purifying tower 1 has a transversal cross sectional shape in which two circles are partially joined with each other, and in which two stirrers each having a rotational shaft 2 and blade members 3 arranged spirally at the surface thereof are disposed at the centers for the circles, respectively. Each rotational shaft 2 has a column shape, on the outer circumferential surface of which the blade member 3 each having a trapezoid shape are mounted at the interval of about 90°. Each blade member 3 is inclined upwardly in the rotational direction of the shaft 2. The blade members 3 of both of the rotational shafts 2 are alternately overlapped with each other at the intermediate portion between the shafs 2.

Figure 1:
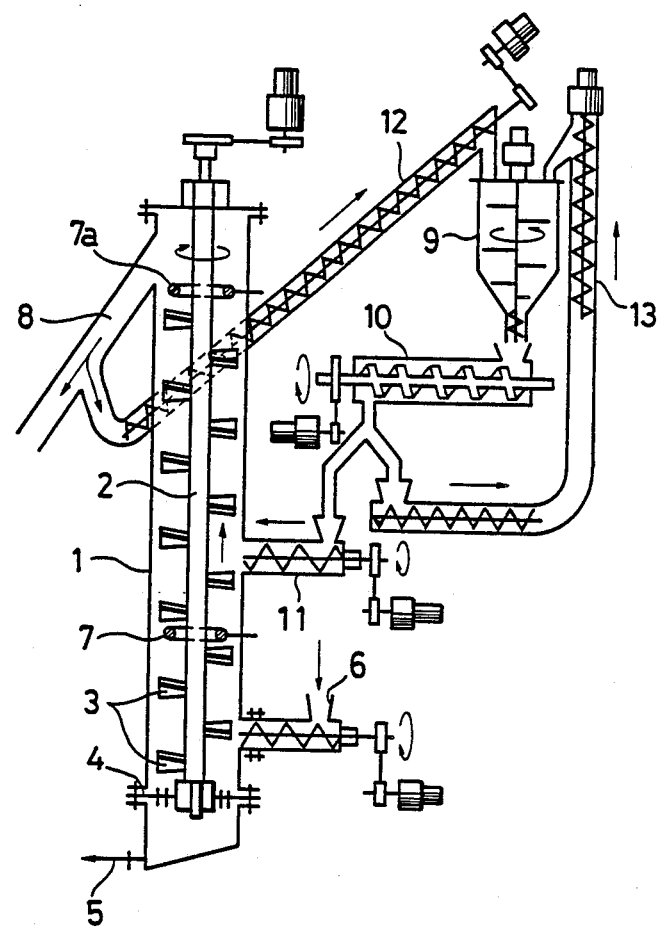
FIG. 1 is a schematic vertical sectional view of a crystal purifying apparatus according to an embodiment of the invention.
Figure 2:
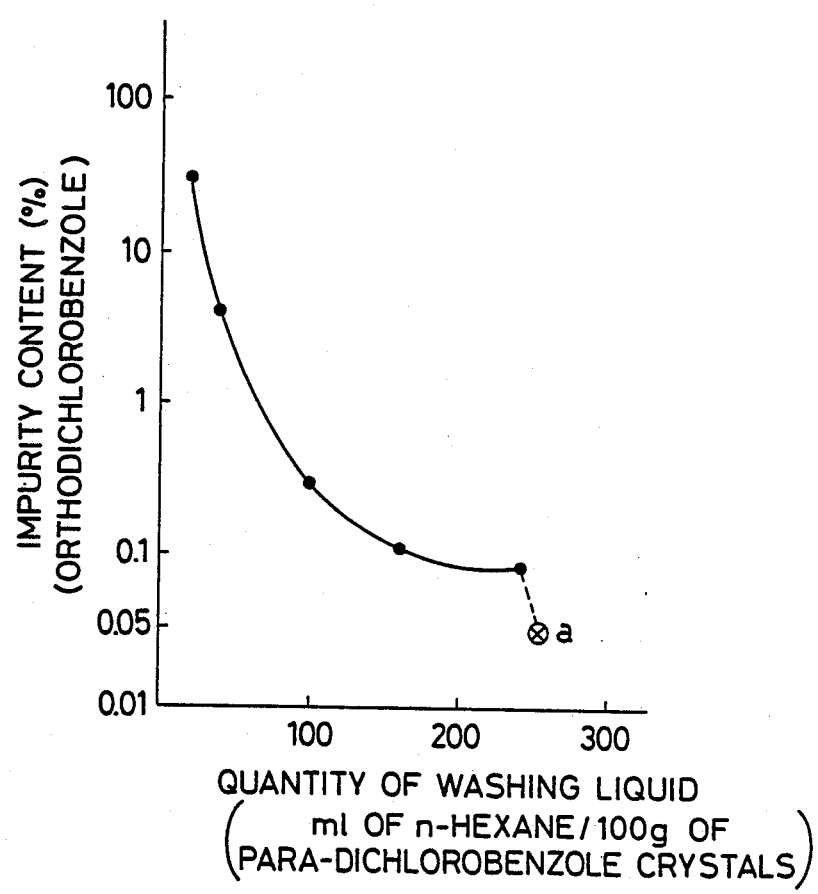
FIG. 2 is a graph illustrating the relationship between the quantity of washing liquid and the impurity content when crude crystals are washed.

As shown in FIG. 1, the purifying tower 1 has a solid-liquid separation plate 4 disposed at the bottom portion of the tower 1, a liquid take out port 5 below the separation plate 4, a starting crude crystal feed port 6 above the separation plate 4, and heating means 7 disposed in a multistage manner along the longitudinal direction of the tower 1. In FIG. 1, however, only the uppermost part 7a and the lowermost part 7b of the heating means 7 are shown and the intermediate parts thereof are omitted.

The purifying tower 1 has a purified crystal take out port 8 at the upper portion thereof. As shown in FIG. 1, the purified crystal take out port 8 is branched so that a portion of purified crystals taken out from the tower 1 are transferred to an elevation conveyer 12. The purified crystals separated at the purified crystal take out port 8 are compulsively fed back to the purifying tower 1 through the elevation conveyor 12, a precooling tank 9, a cooler 10, and a cooled-crystal feed means 11. A part of the cooled crystals taken out from the cooler 10 is circulated to the precooling tank 9 through a recycle conveyer 13.

In operation of the apparatus as above, the starting material of crude crystals containing the crystal component to be purified is fed to the purifying tower 1 through the starting crude crystal feed port 6. The crude crystals are purified while uprising in the purifying tower 1 by the function of the blade members 3 of the rotational shafts 2. The uppermost part 7a of the heating means 7 is preferably disposed near the purified crystal taken out port 8 and kept at a temperature of the melting point of the aimed crystal component or somewhat higher than it. Parts of the heating means 7 on and after the second stage are preferably disposed almost at a constant interval which may be determined such that the most of the crystal component molten by the part of the heating means 7 just above is fully recrystallized for the interval. The heating temperature of each part of the heating means 7 is selected more than the melting point of the crude crystals existing at the portion of the purifying tower 1.

Although the heating means 7 may comprise heating equipments to be attached such as electric heaters, it is preferred that the blade members 3 are utilized for this purpose, for example, ones of the blade member 3 are designed so that steam or the like can be introduced into the insides thereof because it is preferable that there is disposed nothing but the stirrers in the purifying tower 1.

In the case that such a heating means is disposed only at the upper portion of the purifying tower like the apparatus as described in the Japanese Patent Publication No. 40621/1972, although the recrystallization of the liquid component molten by the heating means and the melting and recrystallization of other crystals due to the liquid component are taken place in the vicinity of the heating means, in the portion of the purifying tower lower than the heating means, only the washing effect by the liquid components and a little separating a crystal from the liquid component can be expected so the purification yield is bad.

In this embodiment, the heating means 7 are disposed in a multistage manner in the purifying tower 1. Therefore, crude crystals fed to the purifying tower 1 through the starting crude crystal feed port 6 are partially molten in the vicinity of each part of the heating means 7 and the resulted liquid is utilized for melting and washing other part of the crude crystals as well as recrystallizing itself. Repeating such actions, the crystals are purified while being elevated toward the top of the tower 1 by stirrers. According to this embodiment, since the whole of the tower length is available as described above, the crystal component is purified to a purity of more than 99.9% when reaching the top of the tower 1.

However, only by disposing the heating means in a multistage manner, it is only that the quantity of molten crystals is increased by increasing the amount of heat and the whole of the tower length does not become available. In order that the crude crystals are purified while uprising in the tower, the component to be purified must be present in a crystal form in the tower. For this reason, the crystal component molten at an intermediate part of the tower must be compulsively cooled to be recrystallized rapidly. However, because no suitable means for removing heat from the tower has been known so far, the whole of the tower length has not been available even by disposing the heating means in a multistage manner. In contrast to this, in this embodiment, a portion of purified crystals taken out from the top of the tower 1 is cooled and the cooled crystals are compulsively fed back to an intermediate portion of the tower 1. Thereby, the removal of heat from the tower 1, that is, the recrystallization of molten crystal component is taken place so that the filling condition of the tower 1 with crystals is adequately maintained.

The purified crystals to be fed back to the tower 1 are separated from the purified crystals taken out through the purified crystal take out port 8 and then transferred by the conveyor 12 to the precooling tank 9 and subsequently the cooler 10 to be cooled. In this case, however, they must be prevented from solidification. The cooled crystals may be obtained as the following manner. The precooling tank 9 is provided with a large number of purified crystals which have been cooled. The amount of purified crystals to be fed to the purifying tower 1 is then added to the cooled crystals in the precooling tank 9 and they are stirred and mixed. The thus precooled crystals taken out from the precooling tank 9 are cooled to a desired temperature in the cooler 10.

In this case, it is preferred that the blades of the stirrer disposed in the precooling tank (crystal mixing tank) 9 have a rotational shaft in the form of an elongate round rod so as to reduce the flow resistance upon mixing the crystals, as well as that the agitating blades are secured spirally around the rotational shaft so as to provide a function of transferring the crystals from the upper position to the exhaust port below while mixing them. Furthermore, it is desired that the top end of the rotational shaft is extended to a discharge pipe at the bottom of the crystal mixing tank 9, and the portion of the shaft extending into the discharge pipe is provided with a screw blade for providing an adequate crystal crushing function.

Further, it is preferred that the cooler 10 comprises a cooling screw or a cooling board in a structure capable of passing a coolant through the inside so that the crystals fed from the precooling tank (crystal mixing tank) 9 may be cooled to a desired temperature while being sent to the outlet of the cooler.

The crystal component at low purity in a liquid form separated by the solid-liquid separation plate 4 may be discarded from the liquid take out port 5 out of the system. However, especially in the case that the amount of the liquid is large, it is preferred that the crystal component is recovered from it. For this purpose means for cooling and circulating the crystal component at low purity to the purifying tower as desclosed in the Japanese Patent Laid-open No. 25504/1985 can be utilized almost as it is.

Figure 5:
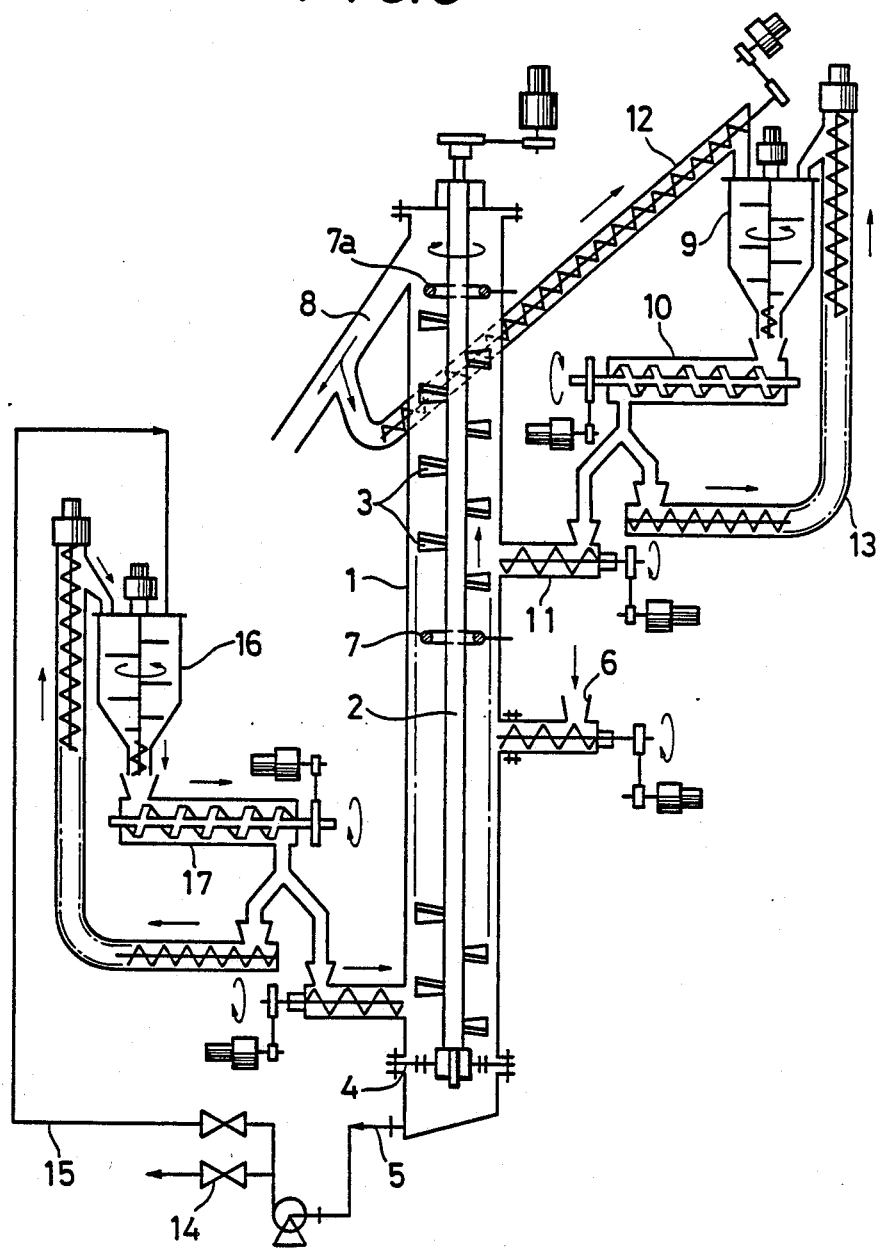
FIG. 5 is a schematic vertical sectional view of a crystal purifying apparatus according to another embodiment of the invention.

FIG. 5 shows an apparatus for this purpose according to the second embodiment of the invention. In this embodiment, the crystal component at low purity in a liquid form is taken out from the bottom of a purifying tower 1 through a liquid take out port 5 and a portion thereof is discarded from a discharge port 14 so as to prevent impurities from accumulating in the system. While on the other hand, the remaining portion of the liquid is sent through a line 15 of a precooling tank 16 and subsequently to a cooler 17, in which the crystal component at low purity is cooled and recrystallized. The thus obtained crystals at low purity are fed to the purifying tower 1 at an intermediate portion between a starting crude crystal feed port 6 and a solid-liquid separation plate 4. The precooling tank 16 and cooler 17 for recovering the crystal component at low purity may have the same constructions as the precooling tank 9 and cooler 10 for cooling the aimed crystal component, respectively.

When the crystal component is purified by the apparatus as shown in FIG. 1 or Fig. 5, a small amount of washing liquid such as acetone, methanol, propanol, or the like may be sprinkled from the top of the tower 1 to improve the washing effect.

According to the invention, since the heat balance within the purifying tower can be adequately maintained by circulating the cooled crystals into an optional portion of the purifying tower in accordance with the aimed purity of the crystal component. Therefore, the amount of heat can be increased so as to improve the washing, sweating and recrystallizing effects together. As the result, of course when the impurity component contained in crude crystals has formed an eutectic system with the aimed crystal component, even if it has formed a solid solution system which is hard to purify in general, the high grade purification can be taken out.

In addition, the crystal purification according to the invention is advantageous in that the product can be processed with less thermal damages since the separation of the substance is taken place at a melting point much lower than the boiling point of the substance.

Furthermore, the crystal purification according to the invention has a merit in that waste steams or drains at a low pressure can be utilized as the high heat source and an inexpensive heat source such as sea water can be utilized as the low heat source in a case where the boiling point of the aimed crystal component is less than 100° C., for instance, as in the case of naphthalene upon purification.

As many apparently widely different embodiments of this invention may be made without departing from the spirit and scope thereof, it is to be understood that the invention is not limited to the specific embodiments thereof except as defined in the appended claims.

What is claimed is:

1. An apparatus for purifying crystals comprising:

a crystal purifying tower, the transverse cross-section of said tower taking the shape in which two circles partially overlap with each other;

a stirrer comprising a rotational shaft, one such stirrer extending through the center of each of said circles, and blade members disposed spirally on the circumference of each rotational shaft with the respective paths of movement of the blade members overlapping and with the centers as well as the respective blade members being spaced from each other so that the blade members on one rotational shaft do not interfere with the movement of blade members on the other rotational shaft;

said stirrers operating to move material upwardly in the apparatus;

a bottom portion of said tower;

a solid-liquid separation plate disposed in said bottom portion near above the tower bottom;

a liquid take out means disposed below said separation plate;

a starting crude crystal feed means disposed above said separation plate;

an upper portion of said tower;

a purified crystal take out means disposed in said upper portion;

an intermediate portion of said tower defined between said starting crude crystal feed means and said purified crystal take out means;

multiple heating means disposed in said tower along the vertical direction of the tower;

purified crystal circulation means for cooling a portion of purified crystals taken from said purified crystal take out means;

and means for feeding said cooled portion of purified crystals back to said tower at at least one location of said intermediate portion.

2. An apparatus according to claim 1, wherein the uppermost part of said heating means is disposed near said purified crystal take out means.

3. An apparatus according to claim 1, wherein said heating means comprise electric heaters.

4. An apparatus according to claim 1, wherein at least some of said blade members define passages for heating fluid whereby said blade members comprise at least some of said heating means.

5. An apparatus according to claim 1, wherein said purified crystal circulation means comprises a crystal mixing tank for mixing the purified crystals taken out from the purifying tower with crystals circulated to said mixing tank through a recycle conveyor, and a cooler for continuously cooling the crystals.

6. An apparatus according to claim 5, wherein said purified crystal circulation means further comprises a means for circulating an amount of the crystals cooled in said cooler to said crystal mixing tank.

7. An apparatus according to claim 5, wherein said crystal mixing tank comprises blades disposed spirally around a rotational shaft in the form of an elongate round rod, and a stirrer having a screw blade is provided inside a discharge pipe disposed at the bottom of said crystal mixing tank.

* * * * *